(12) United States Patent
Woo et al.

(10) Patent No.: US 6,627,167 B2
(45) Date of Patent: Sep. 30, 2003

(54) CATALYST FOR AUTOMOTIVE LEAN-BURN ENGINE AND PROCESS FOR PREPARING THE SAME

(75) Inventors: Seong-Ihl Woo, Seoul (KR); Do-Kyoung Kim, Taegu (KR); Do-Heui Kim, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 2 days.

(21) Appl. No.: 09/756,075

(22) Filed: Jan. 8, 2001

(65) Prior Publication Data

US 2002/0055431 A1 May 9, 2002

(30) Foreign Application Priority Data

Sep. 8, 2000 (KR) ........................................ 2000-53295

(51) Int. Cl.$^7$ ............................ B01J 29/068; B01J 29/44
(52) U.S. Cl. .............................. 423/213.5; 423/239.2; 502/64; 502/66; 502/71; 502/74; 502/77
(58) Field of Search .............................. 502/64, 66, 71, 502/74, 77; 423/213.5, 239.2

(56) References Cited

U.S. PATENT DOCUMENTS

| | | | | |
|---|---|---|---|---|
| 4,882,307 A | * | 11/1989 | Tsao ............................ | 502/66 |
| 5,268,522 A | * | 12/1993 | Bournonville et al. ...... | 585/407 |
| 5,849,255 A | * | 12/1998 | Sawyer et al. ............ | 423/213.2 |
| 6,150,292 A | * | 11/2000 | Merlen et al. ................ | 502/64 |
| 6,281,161 B1 | * | 8/2001 | Marsh ........................ | 502/261 |

OTHER PUBLICATIONS

Filip Acke and magnus Skoglundh, Zeolite Supported Pt Catalysts for Reduction of NO under Oxygen Excess: A Comparision of $C_3H_6$, HNCO and $NH_3$ as Reducing Agents, Applied Catalysis B: Environmental, 21:183–190 (1999).
Mei Xin et al., The Effect of the Preparation Conditions of Pt/ZSM −5 upon its Activity and Selectivity for the Reduction of Nitric Oxide, Applied Catalysis B: Environmental, 21:183–190(1999).
Byong K. Cho and Jae E. Yie, Nitric Oxide Reduction by Ethylene over Pt–ZXM–5 under Lean Conditions: Steady–State Activity, Applied Catalysis B: Environmental, 10:263–280 (1996).
Seong Ihl Woo, et al., Catalytic Activity Novel Pt/ZSM–5 Prepared by Sublimation Method for Selective Catalytic Reduction of NO, theories and Applications of Chem.. Eng., 6(1): 41–44(2000).

* cited by examiner

Primary Examiner—Tom Dunn
Assistant Examiner—Christina Ildebrando
(74) Attorney, Agent, or Firm—Knobbe Martens Olson & Bear LLP

(57) ABSTRACT

The present invention relates to a catalyst for automotive lean-burn engine comprising platinum impregnated on a zeolite support and a process for preparing the same. In accordance with the invention, the catalyst comprising a platinum-impregnated zeolite support can be prepared by sublimation, where the zeolite support effectively eliminates hydrocarbons from automotive exhaust gases by adsorption, and platinum as an active component of the catalyst exerts its catalytic activity through the direct decomposition of nitrogen oxides contained in automotive exhaust gases. Furthermore, the catalyst of the invention provides a widened temperature window for maximum catalytic activity and improved catalytic activity, compared to those of the conventional catalysts. Accordingly, the invented catalyst for automotive lean-burn engine can effectively remove polluting substances such as nitrogen oxides and hydrocarbon present in lean-burn exhaust gases by selective reduction in a continuous reactor, and may be useful in the post-treatment of automotive exhaust gases.

21 Claims, 4 Drawing Sheets

CATALYST FOR AUTOMOTIVE LEAN-BURN ENGINE AND PROCESS FOR PREPARING THE SAME

FIELD OF THE INVENTION

The present invention relates to a catalyst for automotive lean-burn engine comprising platinum impregnated on a zeolite support and a process for preparing the same, more specifically, to a catalyst for cleaning lean-burn exhaust gas prepared by deposition of platinum metal on a zeolite support by sublimation, which has a widened active temperature window and improved catalytic activity per metallic atom, and a process for preparing the same.

BACKGROUND OF THE INVENTION

Methods for converting detrimental substances such as CO, HC, NOx and the like contained in the automotive exhaust gas into harmless substances by reduction or oxidation reaction employing a three-way catalyst of platinum-rhodium impregnated on an alumina support have been well known in the art. However, the three-way catalyst has an inherent disadvantage that the air to fuel ratio (A/F) of the exhaust gas has to be set approximately at a stoichiometric ratio to accomplish efficient cleaning. For example, provided that the lean-burn engine air to fuel ratio is leaner than the stoichiometric ratio, the increased content of oxygen in the exhaust gas from the lean-burn engine causes inefficient reduction of NOx to $N_2$, consequently emitting NOx to the air.

Under the circumstance, a NOx storage catalyst which can eliminate NOx at the lean-burn A/F has been proposed as an alternative catalyst. It was, however, proven to be less satisfactory in a sense that the NOx storage catalyst requires extended treating time and highly sophisticated technology to be employed in an engine, which limits its practical application. In this regard, a catalyst which reduces NOx selectively with unburned hydrocarbons has been proposed to realize an automotive lean-burn engine which is highly efficient and consumes decreased amount of fuel as an exhaust gas cleaning system (see: M. Iwamoto and H. Hamada, Catalyst Today, 10:57–71, 1991).

In order to solve the said problems, a copper catalyst prepared by ion-exchange of ZSM-5 zeolite in solution and a platinum catalyst prepared by ion-exchange of ZSM-5 zeolite in solution have been developed in the art, respectively. Although the ion-exchanged copper-impregnated catalyst showed high catalytic activity, it had a disadvantage of low resistance to water and $SO_2$. The ion-exchanged platinum-impregnated catalyst, meanwhile, showed high catalytic activity even at low temperature and high resistance to water as well. However, it still had a problem of a narrow temperature window for maximum catalytic activity.

Under the circumstances, there are strong reasons for exploring and developing a catalyst having a widened temperature window as well as a high catalytic activity for practical application of automotive lean-burn engine.

SUMMARY OF THE INVENTION

The present inventors have made an effort to develop a catalyst which can remove polluting substances present in automotive exhaust gas, and found that a platinum-impregnated zeolite catalyst prepared by deposition of active metallic platinum component on a zeolite support through sublimation of platinum under CO flow, has a widened temperature window as well as high catalytic activity even at a high temperature, assuring its application as a catalyst for automotive lean-burn engine.

A primary object of the present invention is, therefore, to provide a process for preparing a catalyst for automotive lean-burn engine.

The other object of the invention is to provide a catalyst for automotive lean-burn engine prepared by the said process.

BRIEF DESCRIPTION OF THE DRAWINGS

The above and the other objects and features of the present invention will become apparent from the following descriptions given in the conjunction with the accompanying drawings, in which.

DETAILED DESCRIPTION OF THE INVENTION

The catalyst for lean-burn engine of the present invention is prepared by the steps of: (i) deposition of $Pt(CO)_2Cl_2$ vapor generated by sublimation of $PtCl_2$ under CO flow at 220 to 250° C. on a ZSM-5 zeolite support to obtain a platinum-impregnated zeolite support (Pt/ZSM-5); (ii) washing the platinum-impregnated zeolite support (Pt/ZSM-5) with distilled water and then drying at 80 to 150° C. for 8 to 16 hours; and, (iii) calcining the dried platinum-impregnated support at 300 to 600° C. for 3 to 7 hours.

The process for preparing a catalyst for automotive lean-burn engine comprises the following steps.

Step 1
Preparation of a Platinum-impregnated Zeolite Support (Pt/ZSM-5)

Figure 1:
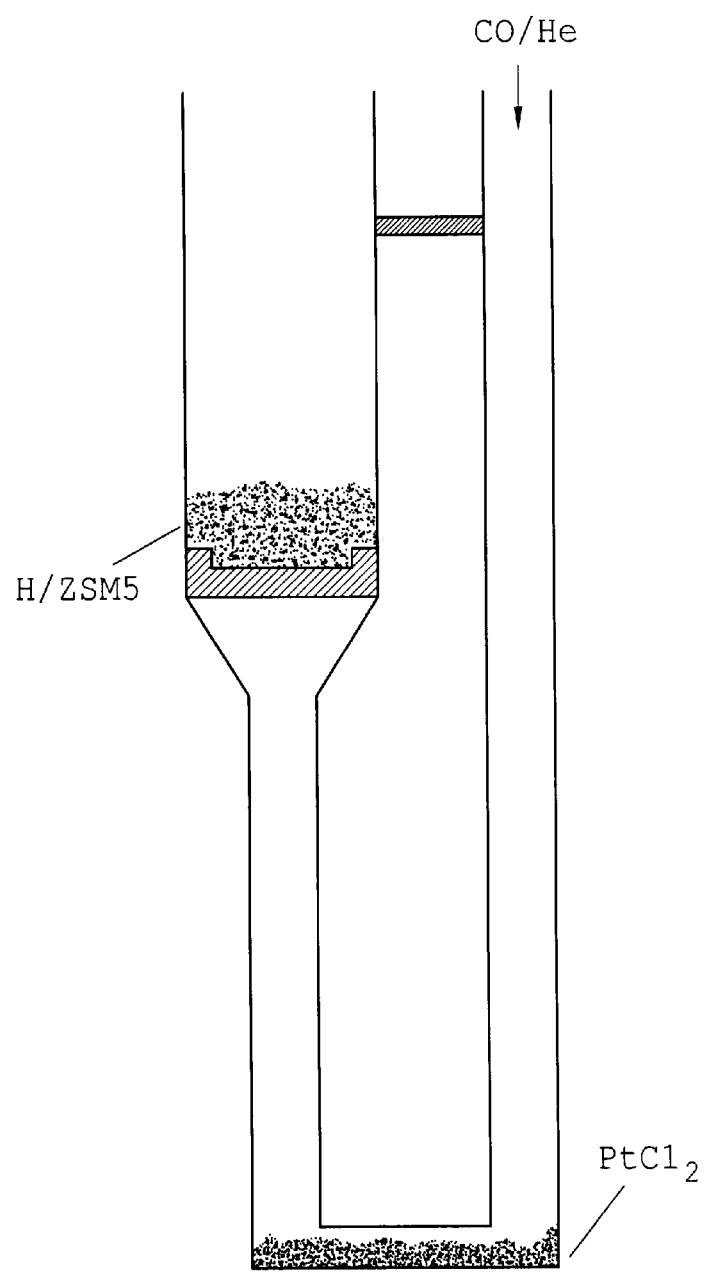
FIG. 1 is a schematic diagram depicting reactor for preparing a catalyst of the invention.

$Pt(CO)_2Cl_2$ vapor generated by sublimation of $PtCl_2$ under CO flow at 220 to 250° C. is deposited on a ZSM-5 zeolite support to give a platinum-impregnated zeolite support (Pt/ZSM-5), where $PtCl_2$ and a ZSM-5, preferably, H-ZSM-5, are loaded into one side of a reactor which is separated by a porous frit. As shown in FIG. 1, $PtCl_2$ is loaded on the bottom of a U-shaped reactor made of quartz, and ZSM-5 zeolite support is loaded on a quartz filter positioned in the middle of the same reactor. $PtCl_2$ is sublimed and carbonylated by CO flowing from the other opening of the reactor. Sublimation of $PtCl_2$ is carried out by flowing 20 to 100% (v/v) CO at a flow rate of 50 to 200 cm³/min, where a mixture of CO and He is employed, provided that the composition ratio of CO is not 100% (v/v), though 100% (v/v) CO with a flow rate of 100 cm³/min is the most preferred. The carbonylation of $PtCl_2$ during sublimation is represented as the reaction scheme below:

Reaction 1

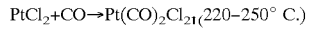

$PtCl_2 + CO \rightarrow Pt(CO)_2Cl_{2(}(220-250° C.)$

While the $PtCl_2$-loaded bottom part of the reactor is heated to 220 to 250° C. for sublimation of $PtCl_2$, the ZSM-5 zeolite support-loaded upper part of the reactor is maintained at the same temperature as the bottom part to make active component of sublimed Pt be deposited on the zeolite support.

Step 2

Washing and Drying

The platinum-impregnated support (Pt/ZSM-5) thus prepared is washed with distilled water, and then dried at 80 to 150° C. for 8 to 16 hours, preferably, at 100 to 120° C. for 9 to 12 hours in an oven.

Step 3

Preparation of Catalyst for Automotive Lean-burn Engine

The dried platinum-impregnated support is calcined at 300 to 600° C., preferably at 450 to 550° C. for 3 to 7 hours, to prepare a platinum-impregnated zeolite catalyst.

The catalyst prepared above is a catalyst comprising platinum impregnated on zeolite support, which contains preferably 88 to 99.8 wt % support and 0.2 to 12 wt % platinum. The said catalyst can be used as a catalyst for automotive lean-burn engine in an intact form, or can be formulated in a form of pellet, powder, bead, ring or honeycomb after reduction under $H_2$ flow at 250 to 500° C. for 2 to 7 hours.

The platinum-impregnated ZSM-5 zeolite catalyst of the invention effectively eliminates hydrocarbons from automotive exhaust gases by adsorption, and platinum used as an active component of the catalyst exerts its catalytic activity through the direct decomposition of nitrogen oxides contained in automotive exhaust gases. Accordingly, the catalyst for automotive lean-burn engine can effectively remove polluting substances such as nitrogen oxide and hydrocarbon present in lean-burn exhaust gas by selective reduction in a continuous reactor, and may be useful in the post-treatment of automotive exhaust gases. Moreover, by cleaning exhaust gases employing the catalyst of the present invention, cost may be reduced by lowering the reaction temperature and enhancing catalytic activity, which may facilitate the commercialization of automotive lean-burn engine.

The present invention is further illustrated in the following examples, which should not be taken to limit the scope of the invention.

EXAMPLE 1

Preparation of Catalyst for Automotive Lean-burn Engine

EXAMPLE 1-1

Preparation of 9.84 wt % Platinum-impregnated Zeolite Catalyst for Automotive Lean-burn Engine In order to deposit active metal component on a zeolite support by sublimation, $PtCl_2$ and H-ZSM-5 were loaded into a separate part of a U-shaped reactor (see: FIG. 1). The H-ZSM-5 used in the reaction was prepared by calcination of ZSM-5 zeolite (ALSI-5, SM-27, Si/Al=11.75) under $O_2$ flow at 773K for 4 hours. Then, under 100% CO with a flow rate of 100 $cm^3/min$, the bottom part of the reactor containing 0.5 g of $PtCl_2$ was heated to 220 to 250° C., and H-ZSM-5-loaded upper part of the reactor was maintained at 220 to 250° C. for 3 hours. And then, 9.84 wt % platinum-impregnated zeolite catalyst for automotive lean-burn engine was prepared by washing the H-ZSM-5 support carrying sublimbed active metallic platinum component with distilled water, followed by drying at 120° C. for 10 hours in an oven, and then calcining under air flow for 5 hours.

EXAMPLE 1-2

Preparation of 0.34 wt % Platinum-impregnated Zeolite Catalyst for Automotive Lean-burn Engine 0.34 wt % platinum-impregnated zeolite catalyst for automotive lean-burn engine was prepared in a similar manner as in Example 1-1.

EXAMPLE 2

Evaluation of Activity of a Catalyst for Automotive Lean-burn Engine

EXAMPLE 2-1

Evaluation of Catalytic Activity of Pt/ZSM-5 Carrying 9.84 wt % Platinum

A model exhaust gas containing 2,000 ppm nitrogen monoxide, 2,700 ppm propylene and 3% oxygen was introduced into a continuous reactor at a flow rate of 140 $cm^3/min$, and added 0.1 g catalyst comprising 9.84 wt % platinum and 90.16 wt % zeolite in a form of ZSM-5. Then, exhaust gas cleaning rate was evaluated under a condition of stepwise elevation of reaction temperature from 200 to 500° C.

Figure 2:
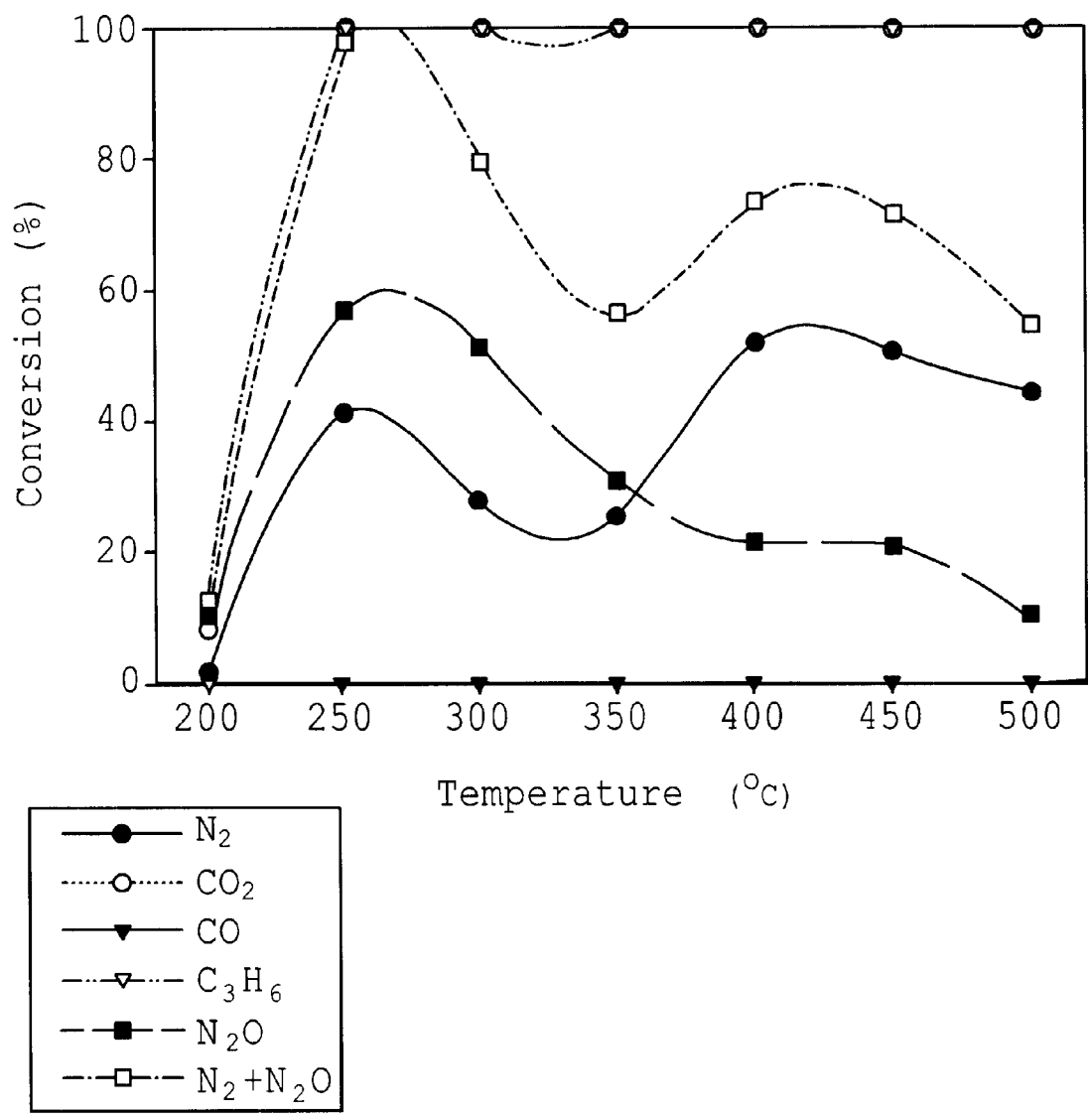
FIG. 2 is a graph showing the catalytic activity of 9.84 wt % platinum-impregnated Pt/ZSM-5 catalyst when propylene is used as a reducing agent.

FIG. 2 is a graph showing the catalytic activity of 9.84 wt % platinum-impregnated Pt/ZSM-5 catalyst, when propylene is employed as a reducing agent: (-●-) represents conversion rate (%) into $N_2$; (-○-), conversion rate into $CO_2$; (-▼-), conversion rate into CO; (-▽-), conversion rate into $C_3H_6$; (-■-), conversion rate into $N_2O$; (-□-), conversion rate into $N_2+N_2O$, respectively. As shown in FIG. 2, conversion of nitrogen monoxide (NO) into nitrogen ($N_2$) and nitrous oxide ($N_2O$) by the said catalyst showed the maximum conversion rate of 98% at 250° C., and the second maximum conversion rate of 73% at 400° C. Therefore, it was clearly demonstrated that the active temperature window was widened, compared to the catalysts prepared by the conventional solvent ion-exchange method.

EXAMPLE 2-2

Evaluation of Catalytic Activity of Pt/ZSM-5 Carrying 0.34 wt % Platinum

Figure 3:
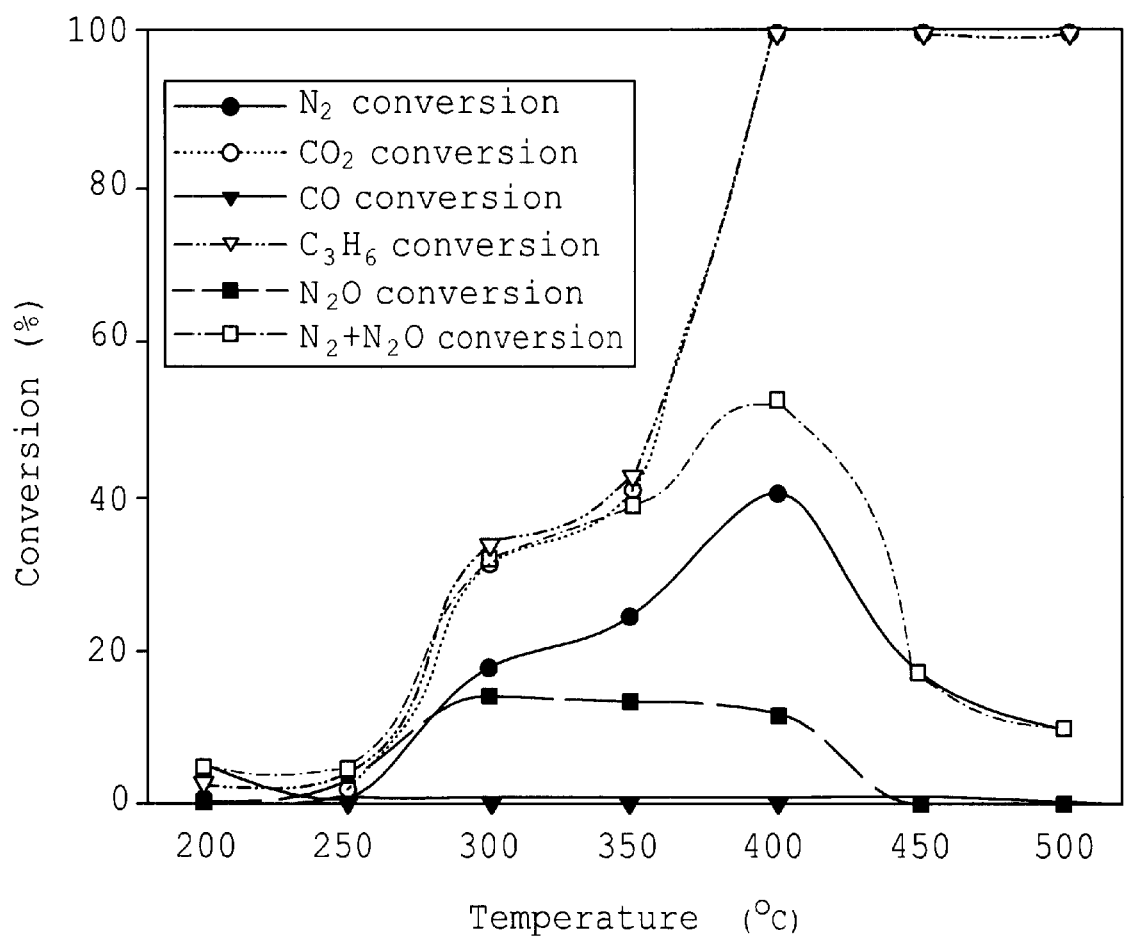
FIG. 3 is a graph showing the catalytic activity of 0.34 wt % platinum-impregnated Pt/ZSM-5 catalyst when propylene is used as a reducing agent.

A model exhaust gas containing 2,000 ppm nitrogen monoxide, 2,700 ppm propylene and 3% oxygen was introduced into a continuous reactor at a flow rate of 140 $cm^3/min$, and added 0.1 g catalyst comprising 0.34 wt % platinum and 90.66 wt % zeolite in a form of ZSM-5. Then, exhaust gas cleaning rate was evaluated under the condition of stepwise elevation of reaction temperature from 200 to 500° C. FIG. 3 is a graph showing the catalytic activity of 0.34 wt % platinum-impregnated Pt/ZSM-5 catalyst, when propylene was employed as a reducing agent: (-●-) represents conversion rate (%) into $N_2$; (-○-), conversion rate into $CO_2$; (-▼-), conversion rate into CO; (-▽-), conversion rate into $C_3H_6$; (-■-), conversion rate into $N_2O$; (-□-), conversion rate into $N_2 +N_2O$, respectively. As shown in FIG. 3, conversion of nitrogen monooxide (NO) into nitrogen and nitrous oxide ($N_2O$) by the said catalyst showed the maximum conversion rate of 32% at 300° C. and the second maximum conversion rate of 52% at 400° C.

EXAMPLE 2-3

Catalytic Activity of Pt/ZSM-5 Employing Iso-butane as a Reducing Agent

A model exhaust gas containing 2,000 ppm nitrogen monoxide, 2,000 ppm propylene and 3% oxygen was introduced into a continuous reactor at a flow rate of 140 $cm^3/min$, and added 0.1 g catalyst comprising 9.84 wt % platinum and 90.16 wt % zeolite in a form of ZSM-5. Then, exhaust gas cleaning rate was evaluated under the condition of stepwise elevation of reaction temperature from 200 to 500° C.

Figure 4:
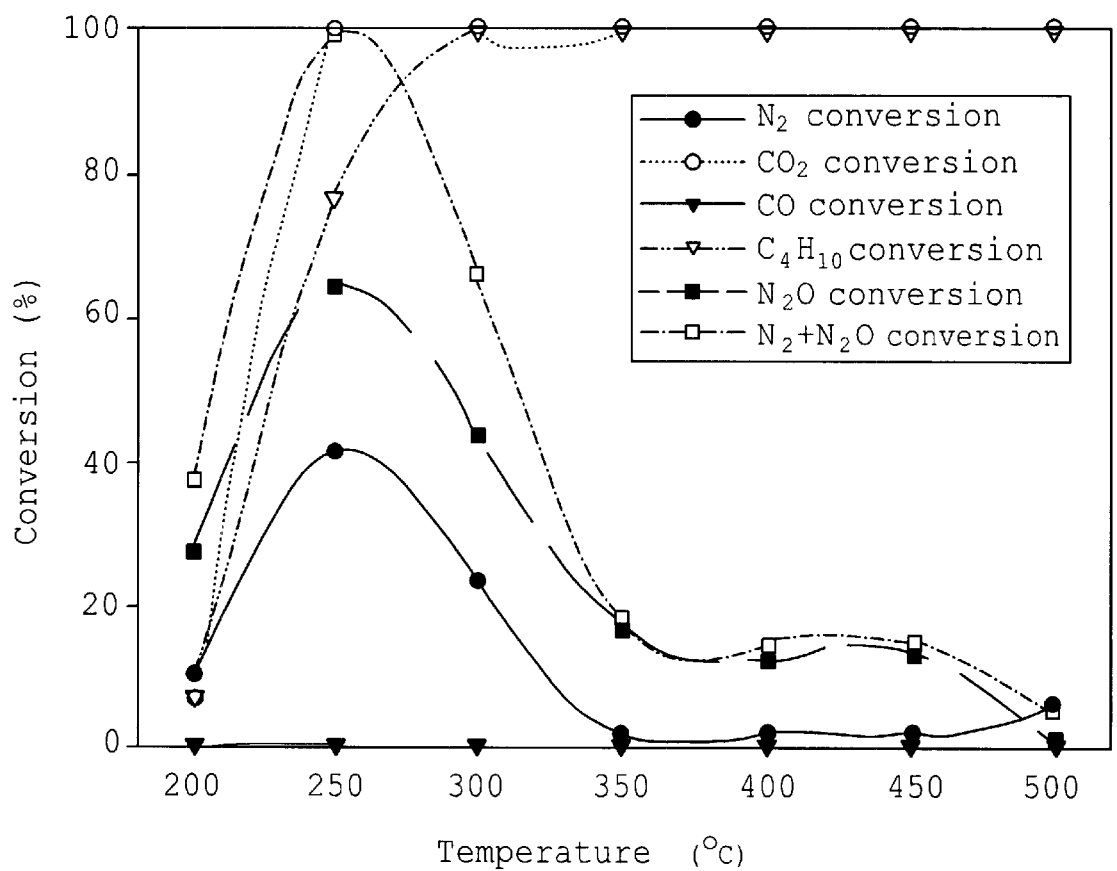
FIG. 4 is a graph showing the catalytic activity of 9.84 wt % platinum-impregnated Pt/ZSM-5 catalyst when iso-butane is used as a reducing agent.

FIG. 4 is a graph showing the catalytic activity of 9.84 wt % platinum-impregnated Pt/ZSM-5 catalyst, when iso-butane was employed as a reducing agent: (-●-) represents conversion rate (%) into $N_2$; (-○-), conversion rate into $CO_2$; (-▼-), conversion rate into CO; (-▽-), conversion rate into $C_3H_6$; (-■-), conversion rate into $N_2O$; (-□-), conversion rate into $N_2+N_2O$, respectively. As shown in FIG. 4, conversion of nitrogen monoxide (NO) into nitrogen ($N_2$) and nitrous oxide ($N_2O$) by the said catalyst showed the maximum conversion rate of 100% at 250° C. Therefore, it was clearly demonstrated that the active temperature window with iso-butane was narrower than that with propylene as a reducing agent in Examples 2-1 and 2-2.

EXAMPLE 2-4
Evaluation of Catalytic Activity of a Catalyst Prepared by Solvent Ion-exchange Method A model exhaust gas containing 2,000 ppm nitrogen monoxide, 2,700 ppm propylene and 3% oxygen was introduced into a continuous reactor at a flow rate of 140 cm³/min, and added 0.1 g catalyst carrying 0.62 wt % platinum which was prepared by the conventional solvent ion-exchange method. Then, exhaust gas cleaning rate was evaluated under the condition of stepwise elevation of reaction temperature from 200 to 500° C. As a result, the catalyst showed the maximum catalytic activity at a temperature of 260° C.

Table 1 shows activity per metallic atom of the catalyst (TON) measured at a temperature range of 250 to 300° C. for catalysts of the invention and the catalyst prepared by the conventional solvent ion-exchange method.

TABLE 1

Activity per metallic atom of the catalyst (TON)

| Type of catalyst | Amount of Pt (wt %) | TON (conversion from NO into $N_2$, sec$^{-1}$) | TON (conversion from NO into $N_2O$, sec$^{-1}$) |
| --- | --- | --- | --- |
| Pt/ZSM-5 (ion-exchange) | 0.62 | $8.9 \times 10^{-3}$ (260° C.) | $1.3 \times 10^{-2}$ (260° C.) |
| Pt/ZSM-5 (sublimation) | 9.84 | $3.3 \times 10^{-2}$ (250° C.) | $4.3 \times 10^{-2}$ (250° C.) |
| Pt/ZSM-5 (sublimation) | 0.34 | $2.3 \times 10^{-1}$ (300° C.) | $1.8 \times 10^{-1}$ (300° C.) |

As shown in Table 1, it was clearly demonstrated that the catalysts prepared by the invention was superior to the catalyst prepared by the prior art ion-exchange method.

Based on the results described above, the catalysts prepared by sublimation of the invention were proven to have a widened temperature window and increased catalytic activity per metallic atom of the catalyst, compared to that of the catalyst prepared by ion-exchange. Therefore, it was clearly demonstrated that the invented catalyst is highly efficient in cleaning of the lean-burn exhaust gas.

As clearly illustrated and demonstrated as above, the present invention provides a catalyst for automotive lean-burn engine prepared by deposition of active metallic platinum component on a zeolite support through sublimation, which has a widened temperature window and improved catalytic activity per metallic atom, and a process for preparing the same. In accordance with the invention, the catalyst comprising a platinum-impregnated zeolite support can be prepared by sublimation, where the zeolite support effectively eliminates hydrocarbons from automotive exhaust gases by adsorption, and platinum as an active component of the catalyst exerts its catalytic activity through the direct decomposition of nitrogen oxides contained in automotive exhaust gases. Furthermore, the catalyst of the invention provides a widened temperature window for maximum catalytic activity and improved catalytic activity, compared to those of the conventional catalysts. Accordingly, the invented catalyst for automotive lean-burn engine can effectively remove polluting substances such as nitrogen oxides and hydrocarbon present in lean-burn exhaust gases by selective reduction in a continuous reactor, and may be useful in the post-treatment of automotive exhaust gases.

What is claimed is:

1. A process for preparing a catalyst for automotive lean-burn engine which comprises:
    (i) deposition of $Pt(CO)_2Cl_2$ vapor generated by sublimation of $PtCl_2$ under CO flow at 220 to 250° C. on a ZSM-5 zeolite support to give a platinum-impregnated zeolite support (Pt/ZSM-5);
    (ii) washing the platinum-impregnated zeolite support (Pt/ZSM-5) with distilled water and then drying at 80 to 150° C. for 8 to 16 hours; and,
    (iii) calcining the dried platinum-impregnated support at 300 to 600° C. for 3 to 7 hours.

2. The process for preparing a catalyst for automotive lean burn engine of claim 1, wherein the CO flow is provided by flowing a gas comprising 20 to 100% (v/v) CO.

3. The process according to claim 1, further comprising reducing the calcined platinum-impregnated support under $H_2$ flow at 250° C. to 500° C.

4. The method of claim 1, wherein the CO flow is at a rate of 50 to 200 cm³/min.

5. A catalyst for automotive lean burn engine comprising a platinum-impregnated zeolite support prepared by the process of claim 1, which essentially consists of 88 to 99 wt % support and 0.2 to 12 wt % platinum.

6. The catalyst for automotive lean-burn engine of claim 5, which is formulated in a form of pellet, powder, bead, ring, or honeycomb.

7. A method of producing a composition for use in cleaning exhaust gas of an engine, the method comprising:
    generating vapor of $Pt(CO)_2Cl_2$; and
    depositing the $Pt(CO)_2Cl_2$ vapor in a zeolite.

8. The method according to claim 7, wherein the generating of the $Pt(CO)_2Cl_2$ vapor comprises flowing gas comprising CO through $PtCl_2$, thereby subliming $Pt(CO)_2Cl_2$.

9. The method according to claim 8 wherein the gas is at a temperature ranged from about 220° C. to about 250° C.

10. The method according to claim 8, wherein the gas further comprises He.

11. The method according to claim 7, wherein the deposition of the $Pt(CO)_2Cl_2$, vapor comprises passing the vapor through the zeolite.

12. The method according to claim 7, further comprising:
    washing the $Pt(CO)_2Cl_2$ deposited zeolite with water; and
    drying the washed zeolite.

13. The method according to claim 12, wherein the drying is conducted at a temperature ranged from about 80° C. to about 150° C.

14. The method according to claim 7, further comprising calcining the $Pt(CO)_2Cl_2$ deposited zeolite at a temperature ranged from about 300° C. to about 600° C.

15. The method according to claim 7, further comprising contacting the $Pt(CO)_2Cl_2$ deposited zeolite with $H_2$ as at a temperature from about 250° C. to about 500° C.

16. The method according to claim 7, wherein the zeolite comprises ZSM-5 or H-ZSM-5.

17. A composition for use in cleaning exhaust gas of an engine, comprising a zeolite and platinum (Pt) impregnated in the zeolite, wherein the composition is produced in accordance with the method of claim 7.

18. The composition according to claim 17, wherein the zeolite comprises ZSM-5 or H-ZSM-5.

19. The composition according to claim 17, wherein the composition contains about 0.2 wt. % to about 12 wt. % of platinum.

20. The composition according to claim 7, wherein the platinum is about 0.35 wt. % to about 9.85 wt. %.

21. A method of converting harmful substance to harmless substance, the method comprises contacting a gaseous mixture comprising a harmful substance with the composition of claim 17.

* * * * *